United States Patent [19]

Albanese

[11] 4,439,343
[45] * Mar. 27, 1984

[54] AEROSOL PREPARATION

[75] Inventor: James J. Albanese, House Springs, Mo.

[73] Assignee: United Industries Corporation, St. Louis, Mo.

[ * ] Notice: The portion of the term of this patent subsequent to Mar. 27, 2001 has been disclaimed.

[21] Appl. No.: 282,050

[22] Filed: Jul. 10, 1981

Related U.S. Application Data

[63] Continuation of Ser. No. 58,732, Jul. 23, 1979, abandoned, which is a continuation-in-part of Ser. No. 932,211, Aug. 9, 1978, abandoned.

[51] Int. Cl.$^3$ .............................................. C09K 3/30
[52] U.S. Cl. ...................... 252/305; 106/10; 106/243; 252/10; 252/90; 252/311; 252/312; 426/811; 524/230; 524/903
[58] Field of Search ............... 252/49.5, 10, 311, 312, 252/90, 305; 426/811; 71/64.08; 424/43, 45, 358; 106/10, 243; 524/230, 903

[56] References Cited

U.S. PATENT DOCUMENTS

| | | | |
|---|---|---|---|
| 2,524,590 | 10/1950 | Boe | 252/305 |
| 2,552,321 | 5/1951 | Jayne, Jr. et al. | 260/404.5 |
| 2,907,664 | 10/1959 | Schoenholz et al. | 106/10 |
| 3,301,808 | 1/1967 | Mack, Jr. et al. | 252/305 X |
| 3,330,730 | 7/1967 | Hernandez | 424/47 |
| 3,387,008 | 6/1968 | Cawley | 260/404 |
| 3,433,868 | 3/1969 | Brechner et al. | 424/47 |
| 3,650,956 | 3/1972 | Strand et al. | 252/90 |
| 3,679,102 | 7/1972 | Charle et al. | 252/305 X |
| 3,705,855 | 12/1972 | Marschner | 252/90 |
| 3,847,622 | 11/1974 | Brandl et al. | 106/10 |
| 3,896,975 | 7/1975 | Follmer | 222/192 |
| 3,929,492 | 12/1975 | Chapman et al. | 252/305 X |
| 3,984,364 | 10/1976 | Taub | 222/192 X |
| 3,998,775 | 12/1976 | Taub | 524/106 |
| 4,014,841 | 3/1977 | Taub | 524/246 |
| 4,073,412 | 2/1978 | Doumani | 222/192 |
| 4,083,954 | 4/1978 | Tsuchiya et al. | 424/47 |
| 4,110,427 | 8/1978 | Kalat | 424/46 |

FOREIGN PATENT DOCUMENTS

| | | | |
|---|---|---|---|
| 683288 | 12/1966 | Belgium | 424/47 |
| 1439945 | 4/1966 | France | 424/47 |
| 2320729 | 3/1977 | France | 424/47 |
| 7215873 | 5/1973 | Netherlands . | |
| 939366 | 10/1963 | United Kingdom | 252/548 |
| 945333 | 12/1963 | United Kingdom | 252/548 |
| 1026831 | 4/1966 | United Kingdom | 424/45 |
| 1282942 | 7/1972 | United Kingdom | 8/429 |
| 1293613 | 10/1972 | United Kingdom | 252/90 |
| 1296356 | 11/1972 | United Kingdom | 424/47 |
| 1295036 | 11/1972 | United Kingdom | 8/429 |
| 1317183 | 5/1973 | United Kingdom | 252/102 |
| 1322084 | 7/1973 | United Kingdom | 8/429 |
| 1384244 | 2/1975 | United Kingdom | 252/54 G |

OTHER PUBLICATIONS

Chem. Abstracts, vol. 76, 1972, pp. 64, 65, Item 15723f.

*Primary Examiner*—Richard D. Lovering
*Attorney, Agent, or Firm*—Kalish & Gilster

[57] ABSTRACT

An aerosol preparation of water base character for providing a continuous film upon dispensing comprising a water phase and an active ingredient phase wherein the active ingredient is water insoluble and adapted for film or coating formation, a liquefied or compressed gas propellant, or combinations thereof, an auxiliary solvent for the propellant, and cocodiethanolamide within the range of 2.5 to 10% by weight of the preparation.

37 Claims, No Drawings

AEROSOL PREPARATION

BACKGROUND AND SUMMARY OF THE INVENTION

This is a continuation of my copending application Ser. No. 58,732 filed July 23, 1979, upon Aerosol Preparation, now abandoned, which was a continuation-in-part of application Ser. No. 932,211 filed Aug. 9, 1978 upon Aerosol Preparation, now abandoned.

Heretofore, there have been innumerable, unsuccessful efforts to develop an aerosol emulsion for providing a continuous, uninterrupted film or coating, whether for decorative or protective purposes, such as with paints, various types of finishes, lubricants, etc., wherein water constitutes the continuous or external phase. With present day knowledge, oil-in-water emulsions have proved inadequate for such purpose as the same are productive of foams which may be basically of two types, that is, the conventional foams, such as, for producing shaving lather, and the sprayable foams used with window cleaners, starch sprays, bathtub cleaners, oven cleaners and the like. But such foams recognizedly are physically quite distinct from a consistent, unbroken film as the same are extremely porous with developed geometric structures determined by the surfactant used, and are hence incapable of film formation.

Correspondingly, the water-in-oil aerosol emulsions wherein oil is the continuous phase and the water the dispersed phase, have proved equally unproductive of a thin, uninterrupted film with such being used to produce non-foaming sprays, such as, room deodorants and the like where a mist-like distribution within a space or volume is sought. Thus, neither type of emulsion has been found amenable to aerosolization for the creation of a nonbroken coating upon the particular surface to be treated, and foremost with respect to water borne active ingredients.

The present accepted incapacity of aerosols to be useful with water based coating agents, such as, for example, latex paints, has been an especial problem of long standing. With present technology, aerosols that require a smooth finish or film on spraying, such as paints, silicone, or the like have utilized solvents other than water as the vehicle. Typical of such solvents are hydrocarbons, such as aromatics, aliphatics, chlorinateds, fluorinateds and the like, wherein, in most instances, the propellant is generally soluble in such solvents and may be considered chemically as part of the solvent active mixture. Thus, in effect, resort has necessarily been made to a single phase system or solution wherein the active ingredient, such as an oil-based paint, is dissolved within a suitable solvent other than water, as particularly, within a wide range of compatible organic solvents. However, the utilization of such solvents or carriers has involved inherent peril factors, as for example, the high risk hazard in that aerosol paint is extremely flammable by reason of the incorporated solvent; and the majority of the commercially used and available solvents have low threshhold limit values that are intensified by the atomization process of the selected aerosol. Furthermore, most of these solvents have undesired ecological consequences in bringing about a further depletion of fossil fuel resources; as well as being uneconomic in light of the continual rise in cost therefor. Additionally, these solvents consistently cause unpleasant and even obnoxious odors.

Accordingly, to the present time there has been no means for aerosolizing agents for providing an unbroken film wherein water is utilized as the solvent so that water based paints, among other coating or finishing agents have had to be applied through means other than aerosols, since neither the utilization of emulsions or of single phase systems have proved efficacious.

There has, therefore, been a continuing effort to solve this problem as such would eliminate immediately the recognized and reluctantly accepted hazards of using aerosol systems with respect to oil based paints, among others.

Therefore, it is an object of the present invention to provide an aerosol preparation which is water based and is productive of an uninterrupted, continuous film and which eliminates all of the various hazards associated with the dispensing of aerosolized ingredients carried in the requisite organic solvents or vehicles.

It is another object of the present invention to provide a preparation of the character stated which is capable of producing a continuous film from a broad spectrum of film and coating agents, such as water-base paints, lubricants, sealants, mold releases, protective coatings, waxes, and the like.

It is a still further object of the present invention to provide a preparation of the character stated which upon dispensing provides a continuous film as distinguished from the foams and sprays heretofore attained by aerosolization of emulsions which are nonproductive of corrosion; which are not fundamentally flammable or toxic so that circumscription as to usage is eliminated thereby presenting a breadth of application hitherto unknown in the aerosol field.

It is a still further object of the present invention to provide a preparation of the character stated which has a substantially indefinite shelf life; merely requiring a degree of agitation prior to each application regardless of the transpired interval between dispensing.

It is another object of the present invention to provide a preparation of the character stand which may be most economically produced; there being no necessity of complex instrumentation and equipment for formulation as the same may be accomplished in accordance with well known production techniques; and which may be charged to individual containers and subjected to the preferred propellant with presently, generally utilized equipment.

Another object of the present invention is to provide a preparation of the type stated which is extremely effective in use; which has demonstrated a remarkable versatility in being adapted for accommodating a most extensive range of varied film-producing agents so as to be endowed with a unique neo-universality; and which preparation may be most economically produced and sold; and with the films developed thereby being tenacious, durable, and proof against rupture, scuffing or the like through the normal intended usage peculiar to the particular film.

DESCRIPTION OF THE INVENTION

The present invention contemplates the development of an aerosol preparation which through its unusual characteristics is both physically and chemically distinct from the customary aerosol emulsions, as well as from the single phase solutions as heretofore used for film formation by oil based paints and the like. The system of the present preparation does embody generally immiscible phases, one of which may be considered a water phase, and the other an active ingredient phase, which phases are normally clearly defined, sharply distinct, and separated. The active ingredient of the active ingredient phase is the agent to be provided in film or coating form and which phase also embodies a liquefied propellant or compressed gas propellant, or combinations thereof, together with a conventional solvent suitable for controlling the evaporation rate of the propellant. However, there is also, and most critically, provided within the active ingredient phase a predetermined quantity of what might be referred to as a dispersal agent, being soluble in both of said phases but in different degrees.

The preparation will thus in its normal state be unhomogenized with the two phases being sharply separated. The separation from a visual standpoint might be likened unto "creaming" as such occurs in various types of emulsions.

When the preparation is to be utilized, immediately prior to dispensing, the same is agitated and then substantially instantaneously dispensed, with the dispensed material being a transitory mixture. As applied the dispensed matter will present a continuous film upon the applied surface, uninterrupted by any type of lacunae, pores or geometric formations so that a coating with desired thickness and entirely continuous is developed. As indicated, the present invention has been proved to be fully successful with water based paints, as well as numerous other film producing agents, none of which has been heretofore discovered to be amenable to film distribution by aerosolization. Although the constituents of the preparation will be discussed in greater detail below, attention is directed to the unique dispersal agent which is critical for the development of aerosol preparations of this invention. It has been found that cocodiethanolamide*, which has been heretofore recognized as an emulsifier, possesses certain unexpected and surprising properties when used in a predetermined proportionality in the two phase system of the present invention. It has been discovered that providing cocodiethanolamide in an amount approximating 0.5% by weight of the system or preparation will react with the water phase and the active ingredient phase to bring about what is generally considered as unstable emulsion, that is, wherein the phases tend to separate, but are capable of being brought into relative stability by agitation, and upon spraying the phases separate and revert to their constituent components whereby the active ingredient does not produce a continuous film but one which is highly irregular and interrupted, typical of the results obtained to the present time when water based solvents are utilized in aerosol form.

*A preparation of this compound which is fully effective for the purpose of this invention constitutes an amber liquid having a congealing point of approximately 6° C. and with a specific gravity at 25° C. of 0.99. The free or unreacted fatty acid, as lauric, 3%–4% maximum and the pH 1% dispersion is between 8 and 9. This commercial compound is stated to possess solubility in alcohols, glycols, ketones, esters, aromatic and aliphatic carbons and chlorinated solvents, while also being dispersible in water at low concentrations of 1 to 2%. It is stated to become soluble at higher concentrations and with a 10% solution being quite viscous approximating a gel.

A commercial source of cocodiethanolamide having the foregoing properties in Clintwood Chemical Company of Chicago, Ill. under the trademark CLINDROL 101-C-G.

If the proportionality of the cocodiethanolamide is increased as within the range of immediately above 0.5% to approximately 2.5% by weight, a resulting stable emulsion is developed and thus the cocodiethanolamide acts in the expected manner of an emulsifying agent, as in a water-in-oil emulsion, so that upon dispensing of such a preparation containing such proportionality, a discontinuous broken film is presented despite the fact that the emulsion is stable. In its generally normal state the emulsion gives a visual appearance of a homogeneous, pasty character, consistent with its being considered stable. Thus, the foregoing merely underscores that cocodiethanolamide as used in the aforesaid proportion with the active ingredients of the preparations of this invention, serves in its characteristic function as an emulsifying agent and with the resultant dispensant being expectedly of a character unlike a continuous film.

However, if the quantity of cocodiethanolamide is increased beyond 2.5%, as within the specific range of 2.5 to 10% by weight, the system looses its stability so that a separation immediately develops which, at first glance, would bear a seeming resemblance to the unstable emulsion incorporating a 0.5% by weight of said agent as above described. Despite any visual similarity between the phase separations of the unstable emulsion and the preparation incorporating in excess of 2.5% by weight of cocodiethanolamide, such generally corresponding phases are quite different both chemically and physically. It is suggested that the preparation with the greater quantity of cocodiethanolamide has become a dispersion, that is atypical of traditional technology having, as stated, the immiscibility of the two phases being sharply defined. Without any intention of limitation, the preparation herein will be referred to as a "dispersion" merely to facilitate exposition. The agitation prior to dispensation merely promotes a momentary intermixture so that upon discharge the dispersion characteristics control as distinguished from the emulsion characteristics which would be overriding if the cocodiethanolamide was 2.5% or below. A continuous film is promoted by the dispersion as distinguished from the discontinuous character of the dispensing of an emulsion.

As developed more fully hereinbelow, the preferred effective range of cocodiethanolamide for aerosol preparations of the present invention is 2.5 to 3.5% by weight. However, research has demonstrated that additional amounts up to 10% by weight bring about no diminution in the character and quality of the developed film. However, above 10% it has been discovered that the applied coating develops an undesirable thickness of a generally lumpy character so that beyond such limit a continuous, unbroken film is no longer achievable.

This crucial, unexpected action caused by the cocodiethanolamide is all the more apparent when one recognizes that the use of emulsifying agents in emulsions cause a predictive response. It is recognized that there are numerous factors which contribute to the relative stability or instability of a particular emulsion but generally when the emulsifier is below a predetermined proportionality the associated emulsion will be in an unstable state with the phases separated. As the emulsifier is added, the emulsion becomes relatively stable, with the phases intermixing to present a homogeneous appearance; and further addition of the emulsifier generally has no effect upon the stability of the emulsion. But with the present invention the further addition of cocodiethanolamide beyond substantially 2.5% by weight of the system brings about a destruction of the erstwhile stability so that if a stable emulsion did exist, one would necessarily expect that the further addition of the cocodiethanolamide would be without effect. As pointed out, this unusual and surprising action of this particular agent supports the view that the system is no longer an emulsion with all of the various accepted emulsion characteristics but becomes a dispersion, with the cocodiethanolamide manifestly ceasing to act as an emulsifying agent. Therefore, the crucialness of this agent to preparations formed in accordance with this disclosure is apparent. It should be fully understood that no other compound has been found to possess the requisite properties despite extensive investigatory effects.

Active ingredients peculiarly adapted for incorporation in aerosol preparations of the present invention are water insoluble and comprehend the active phase of water-base paints commonly referred to as latex paints, exemplary of which are acrylic emulsions, vinyl emulsions, vinyl copolymer acetate emulsions, alkyd emulsions and polyurethane emulsions; mold release and lubricating agents, as for instance, silicones, namely the alkyd polysiloxanes and polyorganosiloxanes; lecithin and other soya or animal fat derivatives; stearates, telefluoromers, as Teflon*; also synthetic lubricants, such as, butoxylated and ethoxylated glycols; as well as polybutene used for transmission belt dressing, etc.; and various common greases, such as lithium stearate, calcium stearate, petrolatum, aluminum naphthenate, and the like for utilization as lubricant coatings; moreover, mineral seal oil, as both a penetrant and a lubricant, as well as petroleum based hydrocarbon oils and synthetic oils are amenable to incorporation in preparations of the present invention. A further category of active ingredients would be constituted of the waxes, including animal waxes, such as beeswax and stearic acid; vegetable waxes, such as carnauba, bayberry and candelilla, as well as the various artificial or synthetic waxes as obtained from distillation of paraffin base petroleum. The foregoing enumerated types and examples of active ingredients for forming constituents of aerosol preparations of this invention is not meant to be exhaustive but merely indicative of the comprehensive range of compounds which by virtue of the uniqueness of this invention may now be aerosolized in water borne systems to provide a continuous film which was heretofore deemed impossible through such aerosolization. All these compositions are of the type wherein the intended usage or purpose requires an unbroken coating.

*TEFLON is a trademark of E. I. DuPont De Nemours & Co., Inc. for tetrafluoroethylene resins.

Accordingly, the range of treatments is infinite when it is recognized that such preparations can provide lubrication, mold release, adhesives, sealants, water displacement sprays, wax coatings, polymeric finishes, such as for floors and like surfaces; inks and dyes; asphaltic undercoatings, polyurethane coatings, and paints.

The particular propellants embodied in aerosol preparations of the present invention are of generally accepted types, that is liquefied, such as, hydrocarbons or halocarbons, as fluorocarbons, and blends of the same, or compressed gases, or combinations of liquefied and compressed gases. The selection of the foregoing is dependent upon desired characteristics relating to evaporation rate, solubility, economics, pressure, and safety. The well known fluorocarbon 12 and fluorocarbon 114 are exemplary of halocarbon propellants equally useful. Generally the hydrocarbon propellants are liquefied petroleum gases, such as propane, butane and isobutane, such being more popular at the present time than the halocarbons due to the possible environmental efforts thereof.

Also, compressed gas propellants, such as carbon dioxide, nitrogen, nitrous oxide, and dimethyl ether may be used with the same facility as with other aerosol preparations but with attention, of course, directed to such considerations as stability and pressure requirements for selection determination.

It is to be understood that the choice of propellant in the present invention is dictated by the same considerations as in aerosol preparations generally and, thus, the precise propellant does not form a part of the present invention.

In order to appropriately control the properties of the selected propellant, a wide range of organic auxiliary solvents for the propellants are used, all as in accordance with known technology. Such solvents are used to control the evaporation rate of the propellant, avoiding rupture of the finish applied, and which evaporation rate may also be controlled by selecting a combination of solvents that will dry in time with the active ingredients. Included among such solvents are those which have heretofore been widely known in the aerosol field, such as aromatic hydrocarbons, examples of which are benzene, toluene, xylene, commercial solvents which flash at 100° and 150°; aliphatics, and aliphatic petroleum napthas, such as heptane, hexane, kerosene, lacquer diluent, napthol spirits, mineral seal oil, mineral spirits, odorless mineral spirits, deodorized kerosene, pentane, petroleum ether, Stoddard solvent, textile spirits, VM&P naptha, isoparaffinic hydrocarbons, as well as mixtures and blends thereof.

Another general class of auxiliary solvents are the chlorinated hydrocarbons; among the more commonly used are carbon tetrachloride; 1,1,1-trichlorethane, methylene chloride, and perchlorethylene.

In addition to the foregoing, which is not meant to suggest an exhaustive compilation of suitable auxiliary solvents, there may be included tetra hydrofuran and 2-nitropropane. As indicated above, and as is implicit in the involved chemistry, the choice of solvent is made in accordance with well known considerations, such as, as indicated, evaporation rate control, compatibility with the particular active ingredient, etc. Further, it is understood that such solvents may be intermixed or blended to produce a desired resultant characteristic. The blending of heptane and hexane is but illustrative in that a blend of the same would dry somewhat slower than hexane alone but faster than heptane if used alone.

The choice of auxiliary solvent is dictated by the same general considerations as in the field of aerosols and, hence, the precise auxiliary solvent does not form a part of the present invention.

Aerosol preparations having the properties of the present invention have the following general formula wherein liquefied propellants, namely the hydrocarbons and halocarbons are used:

|  | PERCENT BY WEIGHT |
| --- | --- |
| ACTIVE INGREDIENT | Approx. .1% to 50% |
| PROPELLANT | Approx. 5% to 30% |
| DISPERSAL AGENT: |  |
| Cocodiethanolamide | 2.5% to 10% |
| AUXILIARY SOLVENT | 10% to 25% |
| WATER | Approx. 11% to 70% |

In those preparations wherein compressed gas constitutes the propellant, the general formulation will be as follows:

|  | PERCENT BY WEIGHT |
|---|---|
| ACTIVE INGREDIENT | Approx. .1% to 50% |
| PROPELLANT | 2% to 5% |
| DISPERSAL AGENT: | |
| Cocodiethanolamide | 2.5% to 10% |
| AUXILIARY SOLVENT | 10% to 25% |
| WATER | Approx. 30% to 73% |

In those preparations wherein the propellant is constituted of a combination of the liquefied and compressed gases, the general formula will be as follows:

|  | PERCENT BY WEIGHT |
|---|---|
| ACTIVE INGREDIENT | Approx. .1% to Approx. 50% |
| PROPELLANT: | |
| Liquefied | 2% to 30% |
| Gaseous | .1% to 5% |
| DISPERSAL AGENT: | |
| Cocodiethanolamide | 2.5% to 10% |
| AUXILIARY SOLVENT | 10% to 25% |
| WATER | Approx. 10% to 75% |

The application of these formulations will become more intelligible as a study is made of specific formulae hereinbelow. However, it will be observed that the range of cocodiethanolamide is quite defined, all as fully discussed hereinabove; and that the proportionality of the propellant and the auxiliary solvents therefor also fall within well acknowledged ranges. Solvents within an amount less than 10% by weight have not demonstrated the capacity to act efficaciously with the propellant and, similarly, levels above 25% appear to have an adverse effect upon the action of the propellant and also increase the potential hazard of flammability. An appreciation of the relative length of ranges with respect to the embodied water and the active ingredient may conceivably be more effectively understood when one considers these two components jointly so that the same in combination will constitute, on average, roughly 70 or slightly more percent by weight of the entire system wherein liquefied propellants are utilized. In compressed gas systems the combined water and active ingredients may jointly constitute as much as 85% by weight of the system.

EXAMPLE I

An aerosol preparation for providing a continuous paint coating may be formulated as follows:

|  | PERCENT BY WEIGHT |
|---|---|
| ACTIVE INGREDIENT | |
| Latex Paint | 49.9% |
| PROPELLANT | |
| 70% Isobutane/ | 20% |
| 30% Propane | |
| DISPERSAL AGENT | |
| Cocodiethanolamide | 2.8% |
| AUXILIARY SOLVENT | |
| Isoparaffinic Hydrocarbon | 16% |
| WATER | 11.3% |

The foregoing constitutes a general formulation useful with all of the well known water base paints. It will be observed that essentially 61.2% by weight of the formula is comprised of the water and the water-base paint which provide the appropriate viscosity and hiding characteristics essential for a pleasing, continuous, uninterrupted finish. The isoparaffinic hydrocarbon is relatively odorless and flashes off at a temperature that will not rupture the finish as evaporation occurs. One particular commercial preparation of this solvent is identified by the trademark ISOPAR L of Exxon Corporation. As indicated above, the isobutane-propane mixture provides a suitable pressure for dispensing but, manifestly, other propellants are equally effective, such as fluorocarbon 12 and combinations of fluorocarbons 12 and 114 and others. Nevertheless this unique formulation will permit attaining an unbroken film which may have desired thickness which has not been heretofore achieved in the field of aerosols.

EXAMPLE II (a)

The following exemplifies the constitution of an aerosol preparation in accordance with the present invention useful in the field of mold release:

|  | PERCENT BY WEIGHT |
|---|---|
| ACTIVE INGREDIENT | |
| Alkyl Polysiloxane | 4% |
| PROPELLANT | |
| 70% Isobutane/ | 20% |
| 30% Propane | |
| DISPERSAL AGENT | |
| Cocodiethanolamide | 3% |
| AUXILIARY SOLVENT | |
| Isoparaffinic Hydrocarbon | 20% |
| WATER | 53% |

This formula exemplifies a paintable silicone mold release preparation wherein the active ingredient, although constituting, seemingly, a small percentage of the formula, attains with the water present a continuous film for promoting ready mutual release of mold components. As a matter of interest the isoparaffinic hydrocarbon in this preparation may be of a type promoting a higher or faster evaporation rate and one commercial form thereof is identified by the trademark ISOPAR C, being a product of Exxon Corporation.

As revelatory of the range of propellants and solvents which may be useful with preparations of the present invention, a similar silicone mold release may incorporate the following constituents:

|  | PERCENT BY WEIGHT |
|---|---|
| ACTIVE INGREDIENT | |
| Dimethyl Polysiloxane | 2.5% |
| PROPELLANT | |
| Carbon Dioxide | 4% |
| DISPERSAL AGENT | |
| Cocodiethanolamide | 3% |
| AUXILIARY SOLVENT | |
| Hexane | 20% |
| WATER | 70.5% |

In this particular formulation it is to be observed that the propellant is a compressed gas, in this instance, carbon dioxide. Thus, such is set forth to demonstrate the efficiency of the present preparations wherein either a liquefied propellant or compressed gas propellant is involved.

EXAMPLE II (b)

The preceding example sets forth formulae for release agents wherein silicone is the active ingredient. However, release agents utilizing other than silicone as the release agent may be equally prepared by this invention. One such formula is as follows:

| | PERCENT BY WEIGHT |
|---|---|
| ACTIVE INGREDIENT | |
| Lecithin | 2.5% |
| PROPELLANT | |
| Dichlorodifluoromethane | 20% |
| DISPERSAL AGENT | |
| Cocodiethanolamide | 3% |
| AUXILIARY SOLVENT | |
| Mineral Spirits | 15% |
| WATER | 59.5% |

Another example of such preparation is as follows:

| | PERCENT BY WEIGHT |
|---|---|
| ACTIVE INGREDIENT | |
| Lecithin | 2.5% |
| PROPELLANT | |
| Difluoroethane | 5.0% |
| DISPERSAL AGENT | |
| Cocodiethanolamide | 3% |
| AUXILIARY SOLVENT | |
| Chlorothene | 15% |
| WATER | 59.5% |
| PRESSURE DEPRESSANT | |
| n-Butane | 15% |

The foregoing discloses the utilization of a pressure depressant, in this case, n-Butane, for bringing about a resultant pressure within the appropriate range in view of the normally excessive pressure of difluoroethane. Thus, the usual hydrocarbons and halocarbons may be used in association with depressants where required.

EXAMPLE III

The present invention is also productive of a silicone lubricant which may be aerosolized and provide the desired finish or film to the treated surface. An example of such preparation is as follows:

| | PERCENT BY WEIGHT |
|---|---|
| ACTIVE INGREDIENT | |
| Dimethyl Polysiloxane | .1% |
| PROPELLANT | |
| 70% Isobutane/ | 20% |
| 30% Propane | |
| DISPERSAL AGENT | |
| Cocodiethanolamide | 3% |
| AUXILIARY AGENT | |
| Isoparaffinic Hydrocarbon | 20% |
| WATER | 56.9% |

Another related formula for providing a silicone film as for lubrication and as particularly for belt rejuvenation is as follows:

| | PERCENT BY WEIGHT |
|---|---|
| ACTIVE INGREDIENT | |
| Dimethyl Polysiloxane | 2% |
| PROPELLANT | |
| Propane | 15% |
| Dimethyl Ether | 5% |
| DISPERSAL AGENT | |
| Cocodiethanolamide | 2.5% |
| AUXILIARY SOLVENT | |
| Methylene Chloride | 15.1% |
| Kerosene | 8.2% |
| WATER | 52.5% |

This formulation is of interest as revealing the incorporation of a mixture of propellants namely, propane and dimethyl ether, as well as a mixture of auxiliary solvents namely, methylene chloride and kerosene, preferably deodorized, which are productive of a desired drying time and avoidance of an adverse odor.

A still further formulation useful for providing a silicone film as a lubrication and wherein the propellant is a combination of liquefied and compressed gases, is as follows:

| | PERCENT BY WEIGHT |
|---|---|
| ACTIVE INGREDIENT | |
| Dimethyl Polysiloxane | 5% |
| PROPELLANT | |
| Liquefied: propane | 5% |
| Gaseous: carbon dioxide | 1% |
| DISPERSAL AGENT | |
| Cocodiethanolamide | 2.5% |
| AUXILIARY SOLVENT | |
| Isoparaffinic Hydrocarbon | 20% |
| WATER | 66.5% |

EXAMPLE IV

The formula of this example is merely illustrative of the proportionality of the components for bringing about a continuous film as used for a dressing upon belts of various types, such as transmissions and the like:

| | PERCENT BY WEIGHT |
|---|---|
| ACTIVE INGREDIENT | |
| Polybutene | 10% |
| PROPELLANT | |
| 70% Isobutane/ | 20% |
| 30% Propane | |
| DISPERSAL AGENT | |
| Cocodiethanolamide | 3% |
| AUXILIARY SOLVENT | |
| Isoparaffinic Hydrocarbon | 20% |
| WATER | 47% |

EXAMPLE V

As developed hereinbelow, aerosol preparations produced in accordance with the present invention are also fully competent to provide a continuous film of grease to serve for lubricating a preselected surface, the provision of which further highlights the uniqueness of this invention and the provision through aerosolization in water borne systems of a surface coating which had not been believed capable of accomplishment to the present time. A representative formula is as follows:

|  | PERCENT BY WEIGHT |
|---|---|
| ACTIVE INGREDIENT | |
| Lithium Grease | 10% |
| PROPELLANT | |
| 60% Fluorocarbon 12 | |
| 40% Fluorocarbon 114 | 30% |
| DISPERSAL AGENT | |
| Cocodiethanolamide | 3% |
| AUXILIARY SOLVENT | |
| 50% Hexane | |
| 50% Heptane | 10% |
| WATER | 47% |

EXAMPLE VI

As the above disclosure impliedly indicates, the present invention is also adapted for dispensing a water-displacement/penetrant which will produce an unbroken film and an illustrative formulation for such purpose is as follows:

|  | PERCENT BY WEIGHT |
|---|---|
| ACTIVE INGREDIENT | |
| Mineral Seal Oil | 10% |
| Colloidal Graphite Dispersion | 0.5% |
| Ethylene glycol monobutyl ether | 1% |
| PROPELLANT | |
| Isobutane | 20% |
| DISPERSAL AGENT | |
| Cocodiethanolamide | 3% |
| AUXILIARY SOLVENT | |
| Odorless Mineral Spirits | 10% |
| WATER | 55.5% |

In the foregoing example, it will be seen that the active ingredient may have certain components mixed therein to endow the same with properties which serve a particular application and thus demonstrate the versatility of this invention.

EXAMPLE VII

Another preparation productive of this development is one whereby a wax may be aerosolized and thus expeditiously and yet fully efficaciously provide the needed uninterrupted finish to the applied surface. The utilization of waxes for preserving and protecting various surfaces is indeed well recognized, being useful on surfaces of all character, whether metal, wood, leather or the like. One such formulation is as follows:

|  | PERCENT BY WEIGHT |
|---|---|
| ACTIVE INGREDIENT | |
| Paraffin Wax | 5% |
| PROPELLANT | |
| 70% Isobutane/ 30% Propane | 20% |
| DISPERSAL AGENT | |
| Cocodiethanolamide | 2.5% |
| AUXILIARY SOLVENT | |
| Isoparaffinic Hydrocarbon | 15% |
| WATER | 57.5% |

Another such formulation is:

|  | PERCENT BY WEIGHT |
|---|---|
| ACTIVE INGREDIENT | |
| Paraffin Wax | 5% |
| PROPELLANT | |
| Liquefied: isobutane | 5% |
| Gaseous: carbon dioxide | 2% |
| DISPERSAL AGENT | |
| Cocodiethanolamide | 2.5% |
| AUXILIARY SOLVENT | |
| Mineral Spirits | 20% |
| WATER | 65.5 |

Further examples of the broad range of waxes which can be dispensed for film formation of this invention are outlined in an illustrative fashion hereinabove.

Another type of preparation wherein wax constitutes the active ingredient as in a formulation referred to generically as leaf polish, is as follows:

|  | PERCENT BY WEIGHT |
|---|---|
| ACTIVE INGREDIENT | |
| Carnauba Wax Emulsion | 50% |
| PROPELLANT | |
| Nitrous Oxide | 4% |
| DISPERSAL AGENT | |
| Cocodiethanolamide | 3.5% |
| AUXILIARY SOLVENT | |
| Acetone | 12.5% |
| WATER | 30% |

This particular formula also exemplifies the utilization of the compressed gas propellant, nitrous oxide.

EXAMPLE VIII

Another formulation demonstrative of the incorporation of a propellant comprised of a combination of liquefied and compressed gases, within the scope of the present invention, is as follows:

|  | PERCENT BY WEIGHT |
|---|---|
| ACTIVE INGREDIENT | |
| Ethoxylated Linear alcohol | 2.5% |
| PROPELLANT | |
| Liquefied: propane | 2.0% |
| Gaseous: nitrogen | .1% |
| DISPERSAL AGENT | |
| Cocodiethanolamide | 3% |
| AUXILIARY SOLVENT | |
| Mineral Spirits | 20% |
| WATER | 72.4% |

The foregoing formulation is exemplary of the adaptability of the present invention for use with detergents and cleaning agents as the above formula is particularly useful in cleaning the white sidewalls of automotive tires.

EXAMPLE IX

The present invention has proved highly utilitarian for dispensing of weatherstrip caulking, thus demonstrating the remarkable versatility of this invention. The following formulation is illustratively typical:

| | PERCENT BY WEIGHT |
|---|---|
| ACTIVE INGREDIENT | |
| Latex Filler | 40% |
| PROPELLANT | |
| Liquefied: Isobutane | 30% |
| Gaseous: Nitrous Oxide | 1% |
| DISPERSAL AGENT | |
| Cocodiethanolamide | 3% |
| AUXILIARY SOLVENT | |
| Isoparaffinic Hydrocarbon | 20% |
| WATER | 11% |

In studying the foregoing formulae it will be appreciated that there has been no indication of the inclusion of customary preservatives and anti-corrosion agents; the use of which would be pursuant to the usual considerations and in keeping with customary techniques.

The formulations herewith submitted serve to demonstrate the broad range of active ingredients that may be incorporated in preparations of this invention for continuous film formation. It is understood that all of the various propellants and auxiliary solvents set forth in the foregoing as examples are equally effective as are the corresponding components set forth in the specific examples which merely establish the effectiveness of the present invention for myriad purposes.

It is to be observed that in the majority of the foregoing formulations hydrocarbons and halocarbons are the propellants most widely used. Compressed gas propellants are, as shown, fully useful with the present preparations but with the selectivity thereof being based upon usual considerations. Effective levels for nitrogen have been found to be about 120 psig (approximately 2%) and for carbon dioxide approximately 50 to 90 psig (from approximately 2.5 to 5%). Nitrogen, although fully effective, has limitd usage in view of the fact that the pressure requirements are too great for commercially available containers. Carbon dioxide would be the propellant of choice if stability studies for each application would demonstrate the lack of formation of carbonic acid. As pointed out hereinabove, the propellants useful in the present invention may be constituted of combinations of the liquefied and compressed gas types which are equally effective and are in many instances economy-producing.

The production of aerosol preparations conforming to the present invention may be effected in most facile manners, all in accordance with known procedures; with all involved steps being undertaken under normal ambient conditions and thus obviating the necessity of environmentally controlled conditions.

One such procedure is: the active ingredient phase is first prepared by incorporating the particular ingredient in the indicated proportion, together with the selected auxiliary solvent and the required amount of cocodiethanolamide. As thus prepared, the active ingredient phase is subjected to agitation which is continued until a solution is formed. Then during continued agitation the prescribed quantity of water is blended in and agitation is maintained to effect an intermixture of the phases. The ultimate dispensing container is then filled in accordance with present technology, with the intermixture which has been maintained in an agitated state to the point of filling. Substantially instantaneously upon discontinuance of the agitation, the water phase and the active ingredient phase will separate and remain in such separated state pending subsequent agitation immediately prior to dispensing. Thus, the procedure for developing any of the myriad formulations embodying the present invention is accomplished in an economical manner, being fully suitable for high volume production, and all in accordance with common practices so as to obviate expenditure for complex, costly equipment or the maintenance of close tolerance conditions.

Immediately prior to a proposed usage, the container for the particular preparation is manually agitated by the user which brings about a transitory mixture of the two phases being, in essence, a quick or most temporary dispersion in which state the discharge occurs. Upon discontinuing discharging the phases promptly separate into the normal, basically two phase condition and remain in such state pending subsequent discharge. Thus, the shelf life of aerosol preparations as developed herein is most extensive since the cyclic mixing and separation as developed through use and through non-use has no deleterious effect upon the ingredients and the phases so that regardless of the passage of time the continuous film produced by this invention is assured.

Having described my invention, what I claim and desire to obtain by Letters Patent is:

1. An aerosol preparation in the form of a dispersion comprising first and second phases in non-emulsified relationship, said first and second phases being immiscible and being normally distinctly separate to render the preparation unhomogenized, said first phase being aqueous and said second phase containing a water insoluble active ingredient in an amount approximately 0.1% to 50% by weight of the preparation, said preparation also containing a dispersal agent consisting of cocodiethanolamide within the range of 2½% to 10% by weight of the preparation, said cocodiethanolamide being an amber liquid having a congealing point of approximately 6 degrees C., a specific gravity at 25 degrees C. of about 0.99, containing a maximum of about 3–4 percent free or unreacted fatty acid (as lauric acid) and having a pH value of 8-9 as a one percent dispersion in water, and being soluble in alcohols, glycols, ketones, esters, aromatic and aliphatic hydrocarbons, and chlorinated solvents, and also being dispersible in water at low concentrations of 1% to 2%, there being a propellant from the class selected from gaseous and liquefied gaseous propellants and mixtures of the same under pressure adequate to disperse the preparation and an organic auxiliary solvent compatible with the selected propellant; said first phase being in an amount constituting between approximately 10% to 75% by weight of the preparation, with the quantity being dependent upon the character of the selected propellant.

2. An aerosol preparation in the form of a dispersion as defined in claim 1 wherein the propellant is a liquefied hydrocarbon or halocarbon or mixtures thereof and constitutes approximately 5% to 30% by weight of the preparation.

3. An aerosol preparation in the form of a dispersion as defined in claim 2 and further characterized by the auxiliary solvent constituting approximately 10%–25% by weight of the preparation.

4. An aerosol preparation in the form of a dispersion as defined in claim 3 and further characterized by the active ingredient and the water jointly constituting approximately more than 50% by weight of the preparation.

5. An aerosol preparation in the form of a dispersion as defined in claim 2 and further characterized by the water constituting approximately 11% to 70% of the preparation.

6. An aerosol preparation in the form of a dispersion as defined in claim 1 and further characterized by the active ingredient being from the class consisting of the active phase of water-base paints, waxes, greases, polysiloxanes, alkyl polysiloxanes, polyorganosiloxanes, polybutene, petroleum based hydrocarbon oils, and synthetic oils.

7. An aerosol preparation in the form of a dispersion as defined in claim 1 wherein the auxiliary solvent is from the class consisting of aromatic hydrocarbons, aliphatics, aliphatic petroleum naphthas, isoparaffinic hydrocarbons, chlorinated hydrocarbons, and mixtures and blends of the same.

8. An aerosol preparation in the form of a dispersion as defined in claim 1 wherein the propellant is a compressed gas and constitutes 2% to 5% by weight of the preparation.

9. An aerosol preparation in the form of a dispersion as defined in claim 8 and further characterized by said compressed gas propellant being from the class consisting of nitrogen, nitrous oxide, carbon dioxide and dimethyl ether.

10. An aerosol preparation in the form of a dispersion as defined in claim 8 wherein the organic auxiliary solvent is from the class consisting of aromatic hydrocarbons, aliphatics, aliphatic petroleum naphthas, isoparaffinic hydrocarbons, chlorinated hydrocarbons, and mixtures and blends of the same.

11. An aerosol preparation in the form of a dispersion as defined in claim 1 and further characterized by said organic auxiliary solvent being from the class consisting of aromatic hydrocarbons, aliphatics, aliphatic petroleum naphthas, isoparaffinic hydrocarbons, chlorinated hydrocarbons, and mixtures and blends of the same, and constituting within the range of 10% to 25% by weight of the preparation.

12. An aerosol preparation in the form of a dispersion as defined by claim 11 wherein the water constitutes approximately 30% to 73% by weight of the preparation.

13. An aerosol preparation in the form of a dispersion as defined in claim 11 wherein the active ingredient is from the class consisting of the active phase of water-base paints, waxes, greases, polysiloxanes, alkyl polysiloxanes, polyorganosiloxanes, polybutene, petroleum based hydrocarbon oils, and synthetic oils.

14. An aerosol preparation in the form of a dispersion as defined in claim 11 and further characterized by said aqueous phase and said active ingredient phase being miscible upon agitation to create a transitory mixture.

15. An aerosol preparation in the form of a dispersion as defined in claim 1 wherein the propellant constitutes a mixture of gaseous and liquefied components in an amount approximately 2.1% to 35% by weight of the preparation.

16. An aerosol preparation in the form of a dispersion as defined in claim 15 wherein the gaseous component of said propellant is a compressed gas from the class consisting of nitrogen, nitrous oxide, carbon dioxide, and dimethyl ether.

17. An aerosol preparation in the form of a dispersion as defined in claim 15 and further characterized by said liquefied component of said propellant being from the class consisting of hydrocarbons, halocarbons and mixtures of the same.

18. An aerosol preparation in the form of a dispersion as defined in claim 1 wherein the dispersal agent possesses a solubility in each of said first and second phases.

19. An aerosol preparation being non-emulsified and in the form of a dispersion for providing upon dispensing and applying to a surface of a continuous, uninterrupted film comprising first and second generally immiscible, distinct, separated phases whereby said preparation in its normal state is unhomogenized, said two phases being transitorily miscible upon agitation, said first phase being aqueous constituting approximately 11% to 17% by weight of the preparation, said second phase comprising a water insoluble active ingredient in an amount approximately 0.1% to 50% by weight of the preparation for formation of said film, a propellant in an amount approximately 5% to 30% by weight of the preparation and being from the class consisting of liquefied hydrocarbons and halocarbons, compressed gases, and combinations thereof, and an organic auxiliary solvent in an amount approximately 10% to 25% by weight of the preparation and being compatible with said propellant for controlling the rate of evaporation of the propellant from the provided film, and with there being a dispersal agent provided in said second phase but being soluble in both said first and second phases and consisting of cocodiethanolamide in such relative amount by weight of the preparation to cause the preparation to be a dispersion, said cocodiethanolamide being in an amount of 2.5% to 10% by weight of the preparation, said cocodiethanolamide being an amber liquid having a congealing point of approximately 6 degrees C., a specific gravity at 25 degrees C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water at low concentrations of 1% to 2%.

20. An aerosol preparation according to claim 19 and further characterized by the cocodiethanolamide having different degrees of solubility in said first and second phases of said preparation.

21. An aerosol preparation as defined in claim 19 and further characterized by the active ingredient being from the class consisting of the active phase of water-base paints, waxes, greases, polysiloxanes, alkyl polysiloxanes, polyorganosiloxanes, polybutene, petroleum based hydrocarbon oils, and synthetic oils.

22. An aerosol preparation being non-emulsified and in the form of a dispersion comprising the following:

| | PERCENT BY WEIGHT |
|---|---|
| Water Insoluble Active Ingredient | Approx. .1% to 50% |
| Propellant - constituting liquefied hydrocarbon or halocarbon or mixtures of the same | Approx. 5% to 30% |
| Dispersal agent - coco-diethanolamide | 2.5% to 10% |
| Organic Auxiliary Solvent | Approx. 10% to 25% |
| Water | Approx. 11% to 70% | said cocodiethanolamide being an amber liquid having a congealing point of approximately 6 degrees C., a specific gravity at 25 degrees C. of about 0.99, containing a maximum of about 3–4 percent free of unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water at low concentrations of 1% to 2%.

23. An aerosol preparation as defined in claim 22 wherein the organic auxiliary solvent is from the class consisting of aromatic hydrocarbons, aliphatics, aliphatic petroleum naphthas, isoparaffinic hydrocarbons, chlorinated hydrocarbons, and mixtures and blends of the same.

24. An aerosol preparation as defined in claims 22 or 23 and further characterized by the active ingredient being from the class consisting of the active phase of water-base paints, waxes, greases, polysiloxanes, alkyl polysiloxanes, polyorganosiloxanes, polybutene, petroleum based hydrocarbon oils, and synthetic oils.

25. An aerosol preparation being non-emulsified and in the form of a dispersion comprising the following:

| | PERCENT BY WEIGHT |
|---|---|
| Water Insoluble Active Ingredient | Approx. .1% to Approx. 50% |
| Propellant - compressed gas | 2% to 5% |
| Dispersal Agent - cocodiethanolamide | 2.5% to 10% |
| Organic Auxiliary Solvent | 10% to 25% |
| Water | Approx. 30% to 73% | said cocodiethanolamide being an amber liquid having a congealing point of approximately 6 degrees C., a specific gravity at 25 degrees C. of about 0.99, containing a maximum of about 3–4 percent free or unreacted fatty acid (as lauric acid) and having a pH value of 8–9 as a one present dispersion in water, and being soluble in alcohols, glycols, ketones, esters, aromatic and aliphatic hydrocarbons, and chlorinated solvents, and also being dispersible in water at low concentrations of 1% to 2%.

26. An aerosol preparation as defined in claim 25 and further characterized by said compressed gas propellant being from the class consisting of nitrogen, nitrous oxide, carbon dioxide and dimethyl ether.

27. An aerosol preparation as defined in claims 25 or 26 and further characterized by said organic auxiliary solvent being from the class consisting of aromatic hydrocarbons, aliphatics, aliphatic petroleum naphthas, isoparaffinic hydrocarbons, chlorinated hydrocarbons, and mixtures and blends of the same.

28. An aerosol preparation being non-emulsified and in the form of a dispersion for providing upon dispensing and applying to a surface a continuous uninterrupted film comprising an aqueous phase and an active ingredient phase which are normally separate, there being a dispersal agent comprising cocodiethanolamide soluble in both phases, said dispersal agent being in an amount equal to 2.5% to 10% by weight of the preparation, said cocodiethanolamide being an amber liquid having a congealing point of approximately 6 degrees C., a specific gravity at 25 degrees C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water at low concentrations of 1% to 2%, said active ingredient phase comprising a water insoluble active ingredient in an amount approximately 0.1% to 50% by weight of the preparation, a compressed gas propellant in an amount 2% to 5% by weight of the preparation, and an organic auxiliary solvent compatible with said propellant in an amount 10% to 25% by weight of the preparation.

29. An aerosol preparation being non-emulsified and in the form of a dispersion for providing upon dispensing and applying to a surface a continuous uninterrupted film comprising an aqueous phase and an active ingredient phase which are normally separate, there being a dispersal agent comprising cocodiethanolamide soluble in both phases, said dispersal agent being in an amount equal to 2.5% to 10% by weight of the preparation, said cocodiethanolamide being an amber liquid having a congealing point of approximately 6 degrees C., a specific gravity at 25 degrees C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water at low concentrations of 1% to 2%, said active ingredient phase comprising a water insoluble active ingredient in an amount approximately 0.1% to 50% by weight of the preparation, a liquefied propellant in an amount approximately 5% to 30% by weight of the preparation, and an organic auxiliary solvent compatible with said propellant in an amount 10% to 25% by weight of the preparation.

30. An aerosol preparation in the form of a dispersion as defined in claims 28 or 29 and further characterized by said aqueous phase and said active ingredient phase being miscible upon agitation to create a transitory dispersion mixture.

31. An aerosol preparation in the form of a dispersion as defined in claims 28 or 29 and further characterized by the water insoluble active ingredient being from the class consisting of the active phase of water base paints, waxes, greases, polysiloxanes, alkyl polysiloxanes, polyorganosiloxanes, polybutene, petroleum based hydrocarbon oils and synthetic oils.

32. An aerosol preparation being non-emulsified and in the form of a dispersion comprising the following:

| | PERCENT BY WEIGHT |
|---|---|
| Water Insoluble Active Ingredient | Approx. .1% to Approx. 50% |
| Propellant: | |
| liquefied | 2% to 30% |
| gaseous | .1% to 5% |
| Dispersal Agent - cocodiethanolamide | 2.5% to 10% |
| Organic Auxiliary Solvent | 10% to 25% |
| Water | Approx. 10% to 75% | said cocodiethanolamide being an amber liquid having a congealing point of approximately 6 degrees C., a specific gravity at 25 degrees C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water at low concentrations of 1% to 2%.

33. An aerosol preparation as defined in claim 32 and further characterized by the gaseous component of said propellant being a compressed gas from the class consisting of nitrogen, nitrous oxide, carbon dioxide, and dimethyl ether.

34. An aerosol preparation as defined in claim 33 and further characterized by said liquefied component of said propellant being from the class consisting of hydrocarbons, halocarbons and mixtures of the same.

35. An aerosol preparation in the form of a dispersion as defined in claim 32 and further characterized by the active ingredient being from the class consisting of the active phase of water-base paints, waxes, greases, polysiloxanes, alkyl polysiloxanes, polyorganosiloxanes, polybutene, petroleum based hydrocarbon oils, and synthetic oils.

36. An aerosol preparation in the form of a dispersion as defined in claims 34 or 35 wherein the organic auxiliary solvent is from the class consisting of aromatic hydrocarbons, aliphatics, aliphatic petroleum naphthas, isoparaffinic hydrocarbons, chlorinated hydrocarbons, and mixtures and blends of the same.

37. An aerosol preparation being non-emulsified and in the form of a dispersion for providing upon dispensing and applying to a surface a continuous uninterrupted film comprising an aqueous phase and an active ingredient phase which are normally separate, there being a dispersal agent comprising cocodiethanolamide soluble in both phases, said dispersal agent being in an amount equal to 2.5% to 10% by weight of the preparation, said cocodiethanolamide being an amber liquid having a congealing point of approximately 6 degrees C., a specific gravity at 25 degrees C. of about 0.99, containing a maximum of about 3-4 percent free or unreacted fatty acid (as lauric acid) and having a pH value of 8-9 as a one percent dispersion in water, and being soluble in alcohols, glycols, ketones, esters, aromatic and aliphatic hydrocarbons, and chlorinated solvents, and also being dispersible in water at low concentrations of 1% to 2%, said active ingredient phase comprising a water insoluble active ingredient in an amount approximately 0.1% to 50% by weight of the preparation, a propellant comprised of a combination of liquefied and compressed gases in an amount approximately 2.1% to 35% by weight of the preparation, and an organic auxiliary solvent compatible with said propellant in an amount 10% to 25% by weight of the preparation.

* * * * *

UNITED STATES PATENT AND TRADEMARK OFFICE
CERTIFICATE OF CORRECTION

PATENT NO. : 4,439,343
DATED      : March 27, 1984
INVENTOR(S) : James J. Albanese It is certified that error appears in the above-identified patent and that said Letters Patent is hereby corrected as shown below:

Claim 19, column 16, line 12, change "17%" to ---70%---.

Signed and Sealed this

Eighth Day of January 1985

[SEAL]

*Attest:*

*Attesting Officer*

GERALD J. MOSSINGHOFF

*Commissioner of Patents and Trademarks*